United States Patent [19]

Brachman

[11] E Re. 31,213

[45] Reissued Apr. 19, 1983

[54] POLYOLEFIN COMPOSITION HAVING HIGH IMPACT RESISTANCE AND HIGH TEMPERATURE FLOW RESISTANCE

[75] Inventor: Armand E. Brachman, Emmaus, Pa.

[73] Assignee: Bethlehem Steel Corporation, Bethlehem, Pa.

[21] Appl. No.: 229,050

[22] Filed: Jan. 28, 1981

Related U.S. Patent Documents

Reissue of:

[64] Patent No.: 4,229,504
Issued: Oct. 21, 1980
Appl. No.: 929,611
Filed: Jul. 31, 1978

[51] Int. Cl.[3] ..... B32B 15/08

[52] U.S. Cl. ..... 428/462; 428/461; 524/525; 524/528

[58] Field of Search ..... 260/42.46, 42.47, 42.33; 428/461, 462

[56] References Cited

U.S. PATENT DOCUMENTS

| | | | |
|---|---|---|---|
| 3,117,946 | 1/1964 | Gorham et al. | 260/45.5 |
| 3,156,666 | 11/1964 | Pruett | 260/42.46 |
| 3,192,288 | 6/1965 | Sayko et al. | 525/197 |
| 3,220,966 | 11/1965 | Flanagan | 260/27 |
| 3,262,992 | 7/1966 | Holzer | 525/88 |
| 3,325,437 | 6/1967 | Peters et al. | 260/31.8 |
| 3,390,208 | 6/1968 | Montgomery | 525/239 |
| 3,457,216 | 7/1969 | Dew | 260/41 |
| 3,539,525 | 11/1970 | Raimondi | 260/33.6 |
| 3,562,790 | 2/1971 | Coover et al. | 525/88 |
| 3,572,721 | 3/1971 | Harrison et al. | 260/4 |
| 3,658,752 | 4/1972 | Das et al. | 260/41.5 A |
| 3,700,614 | 10/1972 | Schenkerberg | 260/23 H |
| 3,860,542 | 1/1974 | Sakaguchi et al. | 260/23 H |
| 3,872,052 | 3/1975 | Fielding et al. | 260/42.46 |
| 3,888,679 | 6/1975 | Komatsu et al. | 260/23 H |
| 3,963,647 | 6/1976 | Straub | 260/42.46 |
| 4,002,595 | 1/1977 | Adelman | 260/42.47 |
| 4,036,912 | 7/1977 | Stricharczuk | 525/211 |
| 4,094,854 | 6/1978 | Harada et al. | 260/42.46 |
| 4,120,844 | 10/1978 | Meyer et al. | 260/42.46 |
| 4,123,417 | 10/1978 | Finberg | 260/42.46 |
| 4,133,797 | 1/1979 | Tirpak et al. | 260/42.46 |

FOREIGN PATENT DOCUMENTS

| | | |
|---|---|---|
| 126458 | 7/1977 | German Democratic Rep. . |
| 1043078 | 9/1966 | United Kingdom . |

OTHER PUBLICATIONS

"Polymerography, A New Field", by M. Matsuo, Japan Plastics, Jul. 1968, pp. 6–16.

"Pelletized Rubber for Polyolefin Plastics Modification", by William S. Smith, Jr., Abstract, Society of Plastics Engineers, Annual Technical Meeting (ANTEC), May 1975, Atlanta, Ga.

"Broadening the Capabilities of Polypropylene for Appliance Applications", by Robert H. Heinold.

Exxon Chemicals–New Products Technical Information–"MD-702, A Pelletized Ethylene Propylene Copolymer Elastomer", Mar. 15, 1974.

B. F. Goodrich–"Impact Resistance, Polypropylene/Epcar Blends"–Informal Property Graphs Communicated to Applicant, Dec. 9, 1976.

*Primary Examiner*—Lewis T. Jacobs

*Attorney, Agent, or Firm*—Joseph J. O'Keefe; Charles A. Wilkinson; John S. Simitz

[57] ABSTRACT

A polyolefin composition having a high level of impact resistance and high temperature flow resistance comprising 30 to 90 weight percent resin containing greater than 50 to less than 75 weight percent of polyolefin and greater than 25 to less than 50 weight percent elastomer, and 10 to 70 weight percent filler.

14 Claims, 3 Drawing Figures

POLYOLEFIN COMPOSITION HAVING HIGH IMPACT RESISTANCE AND HIGH TEMPERATURE FLOW RESISTANCE

Matter enclosed in heavy brackets [ ] appears in the original patent but forms no part of this reissue specification; matter printed in italics indicates the additions made by reissue.

FIELD OF THE INVENTION

This invention relates to new polyolefin compositions. More particularly, this invention relates to new blends of polyolefin compositions containing an elastomer and a filler.

BACKGROUND OF THE INVENTION

It is well known in the polymer field that α-olefins can be polymerized to form normally solid polymers possessing widely differing physical properties, such as melt flow, tensile strength, rigidity and impact strength. Depending upon the level of the particular properties, these polymers are utilized in the formation of fibers, films and molded articles. There are occasions, however, when it is desirable to improve one or more of the physical properties of these polymers for a particular purpose. Many materials have been added to the polymers in efforts to achieve such improvements in the properties. While some specific physical property may be improved in the resulting composition, it is usually at the sacrifice of some other property or properties.

For example, polymers of propylene have been used extensively in the fabrication of molded parts. It is also generally recognized that these polymers are relatively flexible and lack the rigidity required for some end uses, particularly where the fabricated parts are subjected to a relatively high temperature. Specifically, although polypropylene would be an inexpensive core material for steel-plastic laminates in the automotive industry, it will not withstand the high temperatures (375° F.) of the paint baking cycle customarily used in fabricating automotive products. Furthermore, these polymers of propylene lack impact resistance as shown by their low notched Izod impact values. Because of these deficiencies in impact resistance, it has not been possible to substitute lower cost polypropylene for higher cost polymers such as acrylonitrile-butadiene-styrene (ABS).

In order to improve the impact resistance of a polymer such as a propylene homopolymer or propylene copolymers with ethylene and/or other monomers, the polymer is blended with an elastomer. The addition of the elastomer does increase the impact strength of the polymer. However, such addition of elastomer to polymers of propylene result in a lower heat deflection temperature and a loss of rigidity, that is to say the modulus of elasticity is adversely affected. It is also known that additions of different elastomers to the same polymer have varying effects on the strength of the polymer.

Frequently inexpensive fillers are used in polyolefin resins as an extender to replace volume for volume the relatively more expensive polyolefin. When filler is added to a polyolefin, certain properties such as rigidity and heat deflection temperature may be improved. Again such additives often reduce the impact resistance and adversely affect the level of the other properties of the polyolefin composition such that the composition will no longer make satisfactory products.

The prior art discloses compositions comprising additions of both elastomers and fillers to polyolefins in attempts to utilize, in combination, the ability of the individual additives to augment various properties of the particular polyolefin. U.S. Pat. No. 3,572,721 discloses, in general, a blend of rubber and a thermoplastic for use in producing molded play balls, particularly golf balls having good resistance to cutting and producing an acceptable "click" when struck with a golf club. Very broadly disclosed, the blend comprises a substantially crystalline homopolymer or copolymer of an α-olefin and a rubber in an amount of 5 to 95 percent by weight of the blend but, practicably, a molded play ball is 50 to 90 percent by weight rubber. Depending on the size and weight of the ball to be produced filler material from 30 to 70 percent by weight of the polymer can be added.

U.S. Pat. No. 3,860,542 describes a particular propylene resin composition that yields moldings claimed to have excellent mechanical properties such as impact strength, flexibility and flame-retardance. In this embodiment of the invention, the propylene resin composition comprises 40 to 5 parts by weight of a propylene polymer and 60 to 95 parts by weight of alumina trihydrate having a gibbsite crystal structure as the filler and 5 to 15 parts by weight, based on 100 parts by weight of the propylene polymer and filler, of one or more high molecular weight organic substances having a softening point below room temperature.

Polypropylene compositions having improved stiffness are revealed in U.S. Pat. No. 3,872,052. This patent discloses that additions of an impact modifier improves the impact resistance and decreases the stiffness of polypropylene compositions and that addition of acicular hydrated sodium aluminum carbonate is superior to other fillers in imparting stiffness.

U.S. Pat. No. 3,963,647 describes an injection moldable, electrostatically paintable polyolefin composition comprising 20–100 parts of a crystalline propylene polymer, 100 parts of an ethylene-higher α-olefin copolymer elastomer and a carbon black filler. U.S. Pat. No. 4,002,595 discloses directly electroplatable polypropylene compositions comprising a propylene homopolymer or copolymer, an ethylene homopolymer or copolymer, a low polarity rubber, carbon black filler and, optionally, a silicate mineral additive.

While the art discloses compositions containing a polyolefin, an elastomer and a filler having various improved properties, there nevertheless remains a need for polyolefin resin blends that have exceptional impact resistance over a limited compositional range while incorporating relatively high levels of inexpensive filler.

There is also a need for polyolefin resin blends that have exceptional impact resistance and good high temperature flow resistance.

There is a further need for polyolefin resin compositions that offer a cost advantage over the high impact polystyrene resins while affording comparable or superior properties.

There is a still further need for a polyolefin resin composition that can be used as an inexpensive core material for metal-plastic laminates.

Specifically, there is a need for polypropylene compositions having high impact strength and good resistance to flow at automotive paint baking temperatures for use in steel-plastic laminates in the automotive industry.

SUMMARY OF THE INVENTION

I have discovered a composition of matter which has a high level of impact resistance and high temperature flow resistance. The above desired properties can be had with a polyolefin resin blend comprising 30 to 90 weight percent resin and 10 to 70 weight percent filler. The resin portion contains greater than 50 to less than 75 weight percent of at least one polyolefin selected from the group consisting of isotactic crystalline polypropylene, high density crystalline polyethylene, low density polyethylene and propylene-ethylene copolymers. The propylene-ethylene copolymers are 85–95 weight percent propylene and have a tensile yield elongation no greater than about 20%. The remainder of the resin portion is comprised of greater than 25 to less than 50 weight percent elastomer. The elastomers used in this invention are defined as being those rubber-like, impact modifying materials having a break elongation greater than 200%. It is preferred that the filler be an inorganic filler selected from the group consisting of calcium carbonate, talc, clay, silica, quartz, mica, and barytes.

We have discovered that these polyolefin resin compositions are particularly useful as the core material in metal-plastic laminates in which the core material must possess high impact resistance and rigidity and good high temperature flow resistance.

DETAILED DESCRIPTION OF THE INVENTION

Generally, it can be said that the impact strength of a polyolefin composition exhibits an inverse relationship with the amount of filler added. As the filler content increases the impact resistance of the polyolefin composition decreases. In contrast, additions of elastomer to a polyolefin result in increasing impact strength. As increments of elastomers are added to a polyolefin-filler composition, the impact strength of the resulting three component mixture gradually increases as expected. Surprisingly, however, when the resin portion of the three component composition consisting of the polyolefin and elastomer contains elastomer in excess of 25 weight percent, there is a remarkable, sudden jump in the impact strength of the polyolefin blend. The level of impact strength remains extraordinarily high as the elastomer content is gradually and continually increased until at about 45 to 50 weight percent elastomer in the resin portion when it suddenly decreases.

Figure 1:
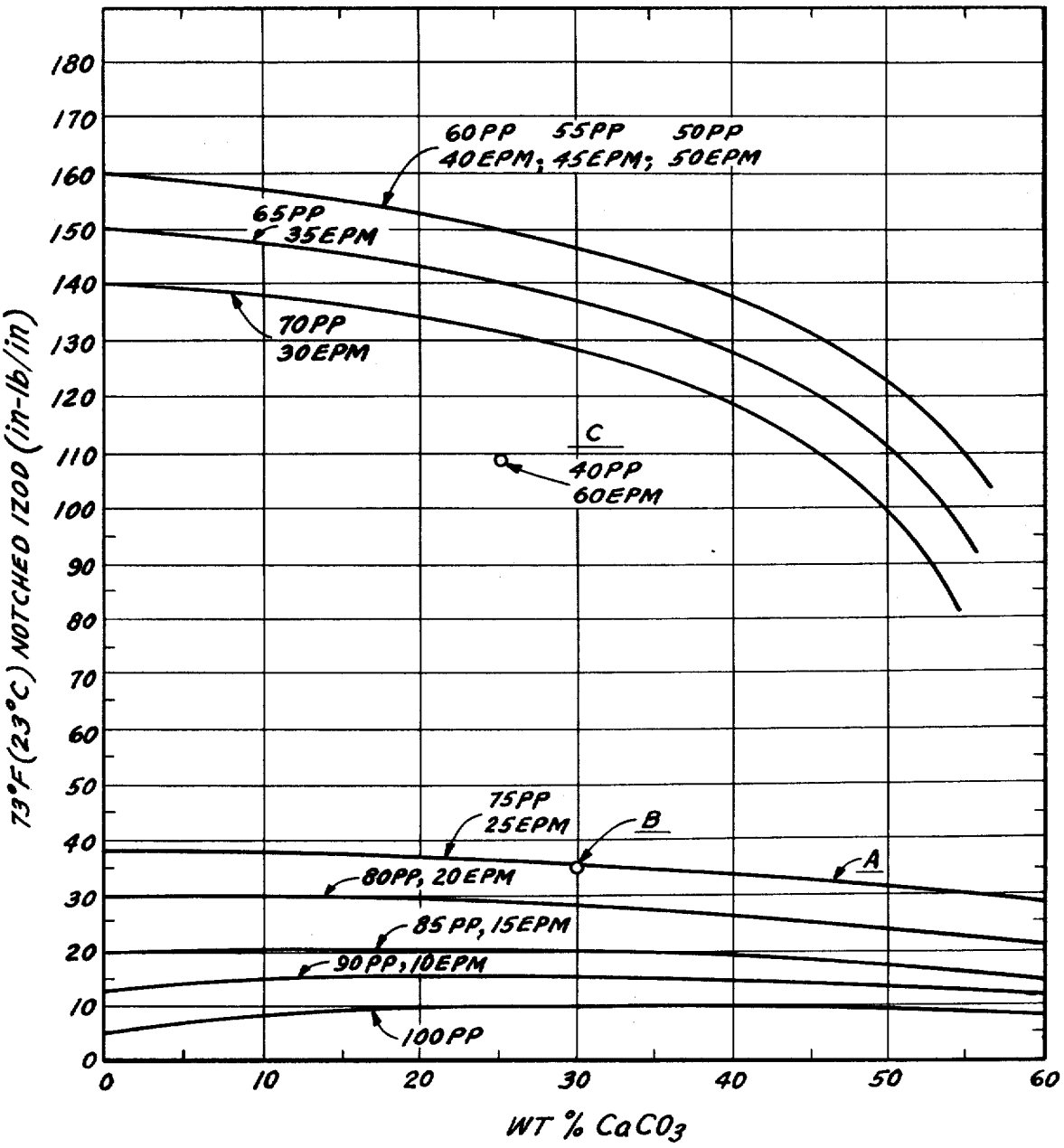
FIG. 1 graphically represents the impact strength of polyolefin resin-filler compositions in which the resin-filler weight ratio varies but the polyolefin-elastomer ratio of the resin portion remains constant.

To illustrate the above, FIG. 1 graphically depicts the impact resistance of various polyolefin-elastomer-filler compositions. The illustrative compositions all contain polypropylene (PP), ethylene-propylene copolymer (EPM) elastomer and calcium carbonate ($CaCO_3$) filler in various amounts. As can be seen from FIG. 1 the impact strength is plotted as the 73° F. Notched Izod (in-lb/in) versus the weight percent of calcium carbonate in the composition. The individual curves reflect the impact strength of compositions in which the ratio of polypropylene to the elastomeric copolymer composing the resin portion remains constant while the resin to filler ratio varies. Using line A as an illustration, the resin portion of any composition falling on line A is 75 percent polypropylene and 25 percent elastomeric copolymer by weight. The composition corresponding to point B on line A is 70 percent resin and 30 percent calcium carbonate filler by weight.

It is readily apparent that as the elastomer content of the resin portion for a given resin-filler ratio is gradually increased in the three component mixture, the impact resistance of the composition increases. As the elastomer exceeds 25 weight percent of the resin portion, the impact resistance rises dramatically as seen by the curve representing 30 weight percent elastomer in the resin portion. Additional increments of elastomer retain this exceptional impact strength until it falls off as demonstrated by the location of point C representing a composition containing about 25 weight percent filler and having 60 weight percent elastomer in the resin portion. The curves representing elastomer contents of 40, 45 and 50 weight percent in the resin portion are substantially superimposable and, thus, are shown as a single curve for all three.

Figure 2:
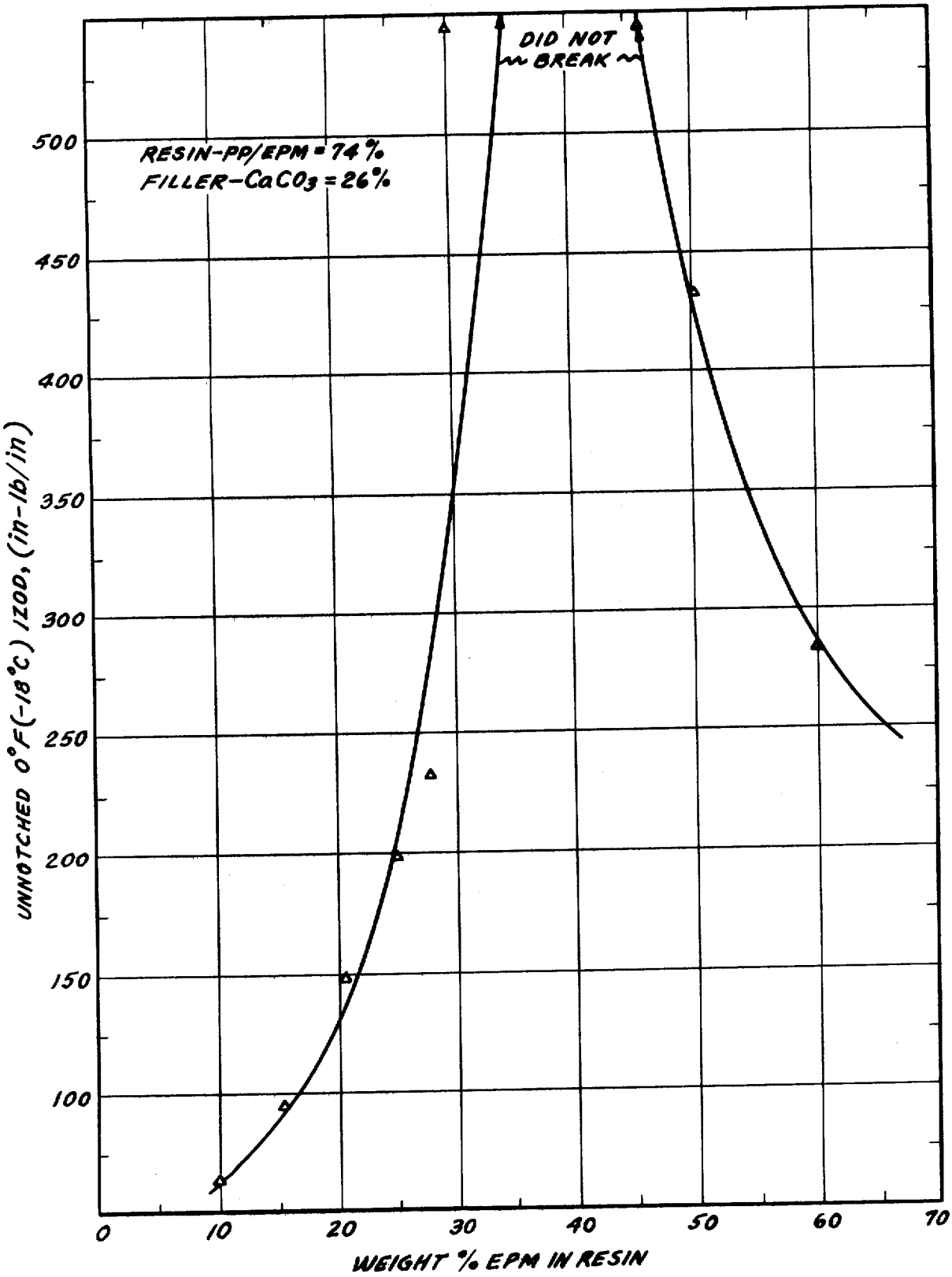
FIG. 2 shows the impact strength of polyolefin resin-filler compositions in which the resin-filler weight ratio is constant but the elastomer content of the resin varies.

The remarkable impact resistance of compositions containing polypropylene (PP), ethylene-propylene copolymer (EPM) elastomer and calcium carbonate ($CaCO_3$) filler, for example, is exemplified in FIG. 2. In this representation the impact strength is plotted as 0° F. Unnotched Izod values versus the weight percent of the elastomer in the resin. In all instances the compositions contain 74 weight percent resin and 26 weight percent calcium carbonate filler. The discontinuity in the curve indicates that range of elastomer in the resin portion of the composition which yielded a sample that did not break during testing. Above the 25 weight percent level of elastomer in the resin portion the curve sharply rises upward representing exceptional impact strength. The impact strength falls off above 45 weight percent elastomer although it is still comparatively high at 50 weight percent elastomer.

Compositions containing other resin-filler weight percentages in which the elastomer content is similarly varied will afford similar "volcano-like" curves. These curves, however, will be displaced further up or down the ordinate axis depending upon the filler content. The same can be said for compositions in which the polyolefin is a high density crystalline polyethylene, a low density polyethylene or a propylene-ethylene copolymer in which propylene is present in 85–95% by weight and has a tensile yield elongation no greater than 20%.

In addition to the remarkable impact resistance possessed by these polyolefin compositions containing from greater than 25 weight percent to about 50 weight percent elastomer in the resin portion, they also exhibit, unexpectedly, good high temperature flow resistance. This resistance to flow at high temperatures is of critical concern where the compositions of this invention are to be utilized as the core material in metal-plastic laminates in which the polymer composition is sandwiched between metal sheets, particularly steel-plastic laminates for use in the automotive industry. These laminates, after being incorporated into the automobile body, are subjected to about 30 minutes at paint baking temperatures of approximately 375° F. The core material must not soften to the degree where it begins to flow from between the steel sheets.

Normally the effect of high temperatures on the deformation of a plastic composition is evaluated by an ASTM testing method (D-648) in which a specimen of the sample in the form of a bar of rectangular cross section is horizontally supported by two support rods while immersed in a heating bath. A load is applied to the test specimen midway between the two support rods. The temperature of the heating bath is gradually increased to a point where the composition of the specimen softens and, due to the force exerted by the load, deflects 0.01 inches. This temperature is known as the heat deflection temperature and is used as a physical description to characterize the composition.

Figure 3:
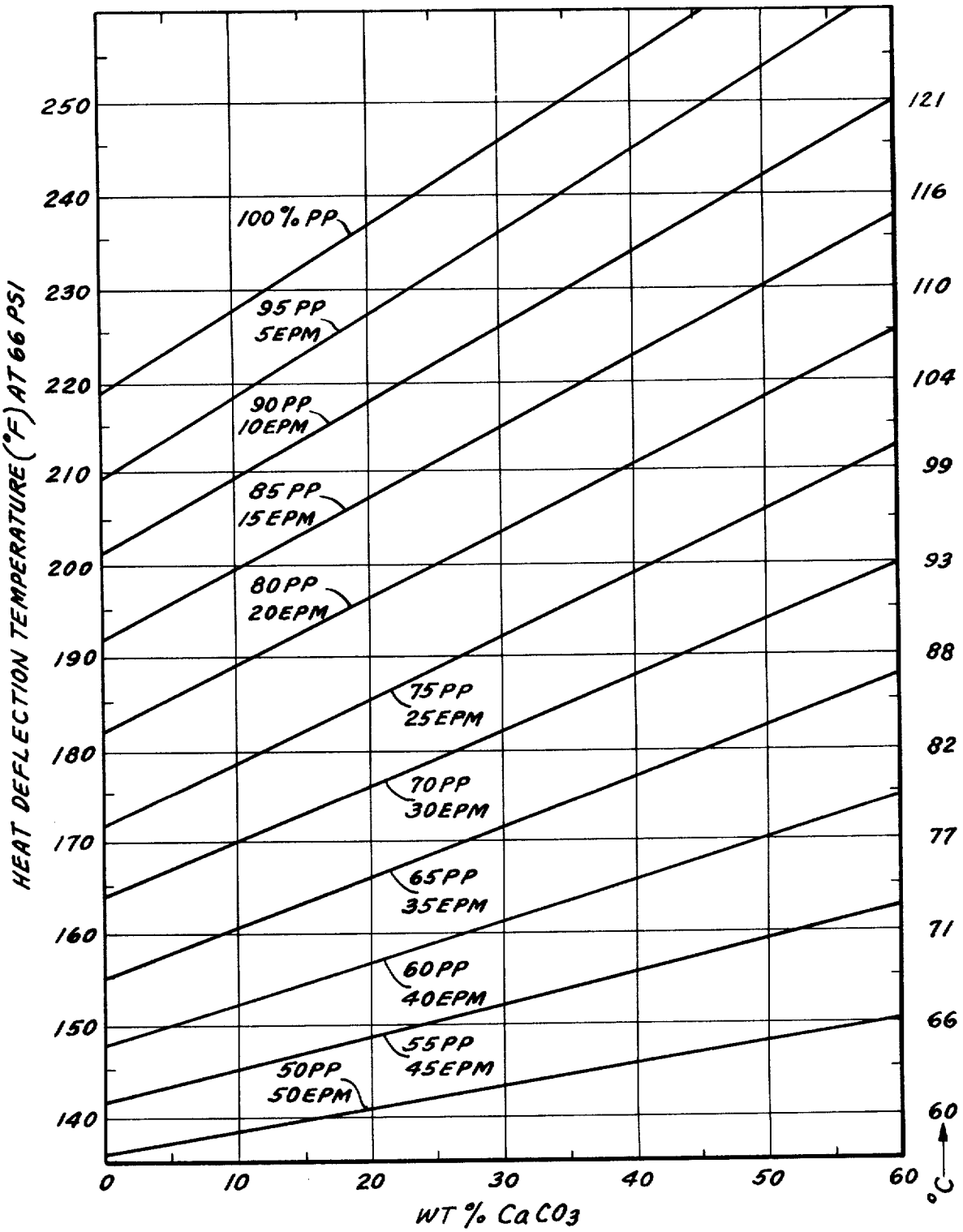
FIG. 3 depicts the heat deflection temperature of resin-filler compositions in which the resin-filler weight ratio varies while the polyolefin-elastomer ratio of the resin portion remains constant.

In FIG. 3 one can see that for a given ratio of polypropylene (PP) to ethylene-propylene copolymer (EPM) in the resin portion the heat deflection temperature of a resin-filler composition increases as the proportion of filler content increases. Also readily apparent is the decrease in the heat deflection temperature as the elastomer content is increased for a given resin-filler ratio. Conversely, for a given filler content, the less elastomer in the resin the higher the heat deflection temperature.

Based on FIG. 3, those polyolefin compositions having the greatest impact strength, namely greater than 25 to about 50 weight percent elastomer in the resin portion, also have relatively low heat deflection temperatures throughout the range of filler loading. Thus one would believe these compositions would not be of value as the core material for metal-plastic laminates that will be exposed to high temperatures. Unexpectedly, the contrary is true. These compositions, while manifesting deflection at relatively low temperatures, do not run at automotive paint baking temperature as do those compositions having higher heat deflection temperatures. The property of a composition by which it retains its shape and resists flow by the action of gravitational force on its mass at automotive paint baking temperature is termed high temperature flow resistance.

Table I presents the data obtained from a simple test performed to evaluate the flow resistance of the polyolefin resin-filler compositions at automotive paint baking temperatures. The compositions of Table I, for the most part, contain polypropylene, ethylene-propylene copolymer elastomer and calcium carbonate filler. Several examples contain talc as the filler. Others utilize crystalline high density polyethylene as the polyolefin. Eight one inch square samples are cut from a sheet of a molded composition which was pressed to a thickness of ⅛ inch on a hot platen press at 380° F. The squares are stacked one on top of the other to form a one inch cube. The cube is placed on a transite cement-asbestos carrier in a circulating air oven at 385° F. for 30 minutes at which time the sample is removed and its shape is observed.

The samples are visually rated on a numerical scale based on the following sets of criteria.

A. General Flowability

1. Cube has flowed to give a thin uniform thickness at least 2 inches in diameter.
2. Cube has flowed outwardly with the center higher than the edges and the longest side about 2 inches wide.
3. Considerable flow has occurred with the center still high and the longest side about 1.5 inches wide.
4. Some distortion.
5. Essentially no change in shape.

B. Corner, Edge and Layer Appearance

1. No corners, edges or layers are visible.
2. No corners, but sheet-like structure is evident.
3. Corners are well rounded and sheet structure is evident.
4. Corners are slightly rounded and layers are generally diffused, but laminar structure is still visible.
5. Essentially sharp, distinctive corners and laminar edges.

The heated samples receive the numerical rating for that characterization which best describes it in each of the two categories. In other words, a sample that completely puddled would receive the worst rating in each category, a 1, and an overall flow rating of 2 (1+1). On the other hand a sample that retained its precise, definite conformation would be awarded a 5 in each category and the best possible overall flow rating of 10. A flow rating of 6 was considered as the minimum passing level at this temperature. Where lower automotive paint baking temperatures will be encountered in industry, a composition achieving a lower flow resistance rating than the passing score of this test would be acceptable.

TABLE I

| | HIGH TEMPERATURE FLOW RESISTANCE - PRO-FAX 6231 POLYPROPYLENE | | | | | |
|---|---|---|---|---|---|---|
| | Weight % Hi-Pflex 100 Calcium Carbonate | | | | | |
| | 0 | 10 | 25 | 35 | 45 | 55 |
| Weight % Vistalon MD-714 (Elastomer) | Flow Resistance Rating ——— Heat Deflection Temperature, 66 psi (—°F.) [1]Talcron CP-10-40 Talc [2]Alathon 7040 High Density Polyethylene | | | | | |
| 0 | 5.5 (218°) | | | | | |
| 20 | | | 3.5 (199°) | | | |
| 25 | | 6.0 (176°) | 6.0 9.0[1] (190°); (230°) | | 8.5[2] (146°) | |
| 30 | | 5.0 (174°) | 6.0 (183°) | 6.0 (189°) | 8.0 8.5[2] (194°); (139°) | 8.0 (196°) |
| 35 | | | 6.0 (178°) | | 10.0[1] (185°) | |
| 40 | | | | 8.0 | | |

TABLE I-continued

| HIGH TEMPERATURE FLOW RESISTANCE - PRO-FAX 6231 POLYPROPYLENE | | | | | |
|---|---|---|---|---|---|
| Weight % Hi-Pflex 100 Calcium Carbonate | | | | | |
| 0 | 10 | 25 | 35 | 45 | 55 |
| | | | (180°) | | |

A sample of 100% polypropylene was judged as not minimally acceptable and received a flow rating of 5.5. While the polypropylene sample has a high heat deflection temperature (218° F.), the flow resistance test indicates at automotive paint baking temperature it will most probably sag and flow from between the metal skins of a metal-polypropylene laminate. The data in Table I shows, in general, that those polyolefin resin-filler compositions containing greater than 25 weight percent elastomer in the resin portion and having exceptional impact strength have lower heat deflection temperatures but acceptable high temperature flow resistance. The flow rating of these compositions is generally 6 or above. It should be noted that the compositions using talc as a filler exhibited excellent flow resistance when exposed to the automotive paint baking temperatures. Similarly, compositions in which high density polyethylene was used as the polyolefin also had very good flow resistance.

From the above analysis of the physical data of the three component compositions it is possible to determine those ranges of polyolefin and elastomer composing the resin portion and the relative percentages of resin and filler that afford a polyolefin composition having both a high level of impact resistance and high temperature flow resistance. By a high level of impact resistance I mean a level at least as high as levels normally encountered in high impact polystyrene plastics. In the polyolefin compositions of this invention the resin portion is about 30–90 weight percent and the filler about 10–70 weight percent. The resin portion comprises from greater than 50 to less than 75 weight percent polyolefin and from greater than 25 to less than 50 weight percent elastomer. The preferred resin-filler content is about 35–75 weight percent resin and about 25–65 weight percent filler. Most preferred is a composition containing about 40–60 weight percent resin and about 40–60 weight percent filler. The preferred blend of the resin comprises about 55–70 weight percent polyolefin and about 30–45 weight percent elastomer.

The polyolefin blended into the composition is at least one polyolefin selected from the group consisting of crystalline isotactic polypropylene, crystalline high density polyethylene, low density polyethylene and a copolymer of propylene and ethylene which is 85–95 weight percent propylene and has a tensile yield elongation no greater than 20%. The elastomer of the composition is defined as being a rubber-like polymer material having a break elongation greater than 200%. Examples of such elastomers would be ethylene-propylene copolymers (EPM rubbers) marketed by Exxon Chemical Co. under the trademarks Vistalon MD-719, Vistalon MD-714, Vistalon 702; an [ethylene-propylenediene] *ethylene-propylene-diene* terpolymer (EPDM rubber) sold by B. F. Goodrich Chemical Co. under the trademark Epcar 847 G9 and a radial block styrene-butadiene copolymer sold by Phillips Petroleum Co. under the trademark Solprene 414P. The preferred fillers are inorganic fillers selected from the group consisting of calcium carbonate, talc, clay, silica, mica, and barytes. The materials, which were used in the following examples, are merely illustrative of materials that can be used in the practice of the invention and are listed in Tables II, III and IV which give pertinent physical data.

TABLE II

| | Polyolefin | | | | |
|---|---|---|---|---|---|
| | Melt Flow (g/10 min) | Density (g/cc) | Notched Izod Impact at 73° F. (in-lb/in) | Tensile Modulus (psi) | Heat Deflection Temperature at 66 psi (°F.) |
| Polypropylene Homopolymers | | | | | |
| Pro-Fax 6231[A] | 30 | .902 | 7.2 | 210,000 | 210 |
| Pro-Fax 6523[B] | 4 | .902 | 10.8 | 215,000 | 216 |
| Exxon E117[C] | 12 | .900 | 6.0 | 209,000 | 220 |
| Exxon CD589[D] | 34 | .900 | 5.2 | 192,000 | 210 |
| Polypropylene Copolymer | | | | | |
| Pro-Fax 7523[E] | 4 | .901 | 30 | 175,000 | 194 |
| High Density Polyethylene | | | | | |
| Alathon 7040[F] | 6 | .96 | 18 | 190,000 | 160 |
| Low Density Polyethylene | | | | | |
| Rexene 178[G] | 20 | .917 | — | 30,000 | — |

Note:
See footnotes

TABLE III

| | Elastomer | | |
|---|---|---|---|
| | Density (g/cc) | Melt Flow (g/10 cc) | Mooney Viscosity D1646 ML 1 + 8 |
| Ethylene-Propylene (EPM) Rubber | | | |
| Vistalon MD-714[H] | .86 | — | 33 (260° F.) |
| Vistalon MD-719[I] | .87 | — | 50 (260° F.) |
| Vistalon 702[J] | .86 | .5 (2160 g) (230° C.) | 40 (212° F.) |
| Ethylene-Propylene-Diene (EPDM) Rubber | | | |
| Epcar 847 G9[K] | .86 | .11 (2160 g) (230° C.) | 80 (212° F.) |
| Styrene-Butadiene Plastomer | | | |

TABLE III-continued

| Elastomer | Density (g/cc) | Melt Flow (g/10 cc) | Mooney Viscosity D1646 ML 1 + 8 |
|---|---|---|---|
| Solprene 414P[L] | .95 | 2.5 (356° F.) | — |

Note:
See footnotes

TABLE IV

| Fillers | Hegman Fineness | Median Particle Diameter (microns) | Oil Absorption (g/100 g) |
|---|---|---|---|
| Calcium Carbonate | | | |
| Hi-Pflex 100[M] (stearate treated) | 6 | 4 | 21 |
| Gama-Sperse 80[N] | 6.7–7 | 1.5 | 18–20 |
| Dix-Fil 10[P] | — | 3 | — |
| Talc | | | |
| Talcron CP-10-40[Q] | 6.5 | 1.8 | 40 |
| Talcron CP-38-33[R] | 4.5 | 3.5 | 30 |
| Clay | | | |
| Kaopaque 30[S] | — | 3 | — |

Note:
See Footnotes

The following examples of polyolefin compositions having high impact strength and good resistance to flow at high temperatures are exemplary of the invention and are not intended to restrict its true scope in any manner. Unless otherwise indicated, the composition blends were basically prepared according to either of the following two general compounding procedures.

COMPOUNDING PROCEDURE A

This general procedure entails the preparation of the composition on a 8"×16" two-roll mill. The power is turned on and the rolls are set in motion (25 rpm). Superheated steam (450° F.) is passed through the rolls for 15–30 minutes. The space between the rolls is narrowed and pellets of the polyolefin are added gradually until the polyolefin has sheeted onto the front roll. A bank of polyolefin is maintained between the rolls. Next the elastomer is added gradually and mixing is continued until a homogeneous mix has been obtained. Finally the filler is added gradually and is roll-milled until it too has been uniformly incorporated. The resultant sheet is removed from the roll and ground in a rotating blade plastic grinder. This ground composition is shaped into test specimens.

COMPOUNDING PROCEDURE B

All the materials are dry blended in a one quart plastic-coated paper cup. A ¾" extruder fitted with a 3/16" diameter circular die and a two-stage mixing screw is operated at 60 rpm and the desired temperature setting. The dry blend is added to the hopper to fill the feed screws. The revolutions of the mixing screw are gradually increased to 200 rpm and the temperature is adjusted to provide a coherent strand which is subsequently passed through a trough of tap water to gradually solidify. The solid strand is next pulled on a belt strand puller and then cut to ⅛" long pellets by passing the strand through a rotating blade pelletizer. The resultant pellets are reprocessed a second time according to the above procedure to afford pellets of a more completely homogenized composition. The pellets from the second processing step are shaped into test specimens.

On the laboratory scale when addind fine, powdery fillers according to Procedure A or B, it is more convenient and preferable to pre-compound the filler with some of the polyolefin by making a concentrate containing 60–70 weight percent filler in the polyolefin. This concentrate is then added to the resin blend containing the remainder of the polyolefin and the elastomer.

TEST METHODS AND PREPARATION OF TEST SPECIMENS

The data reflecting the physical properties of the various polyolefin compositions of the invention were generated according to the following ASTM standards:

| | |
|---|---|
| Flow Rate | D 1238 (I at 230° C.) |
| Density | D 792 A2 |
| Izod Impact | D 256A |
| Tensile Modulus | D 638 |
| Tensile Strength | D 638 |
| Heat Deflection Temperature | D 648 |
| Mooney Viscosity | D 1646 |

Tensile specimens were die cut from a 30 ml sheet with a die made to ASTM specifications. The sheet was compression molded in a flat platen press at 400° F. Bars for Izod impact tests and heat deflection tests were molded to size on a one oz. laboratory ram injector.

EXAMPLE I

| | |
|---|---|
| Pro-Fax 6231 polypropylene | 514 g |
| Vistalon MD-714 elastomer | 229 g |
| Hi-Pflex 100 calcium carbonate | 257 g |

The materials were compounded according to Procedure B. The temperature settings for the extruder were 294° F. for zone 1, 276° F. for zone 2 and 312° F. for the die. When the system had equilibriated and a continuous strand was being produced, the melt temperature on the extruder was 332° F. and 2300–2400 meter-grams of torque were being exerted to produce the strand. Test specimens provided the following physical data of the composition:

| | |
|---|---|
| Tensile Strength (psi) | 1830 |
| Tensile Modulus (psi) | 162,000 |
| Heat Deflection Temp. at 66 psi (°F.) | 169 |
| Notched Izod at 73° F. (in-lb/in) | 126 |

EXAMPLE II

| | |
|---|---|
| Pro-Fax 6523 polypropylene | 372 g |
| Vistalon MD-714 elastomer | 371 g |
| Hi-Pflex 100 calcium carbonate | 257 g |

The three materials were compounded on the extruder according to Procedure B and Example I, the temperature settings being the same. Physical data:

| | |
|---|---|
| Tensile Strength (psi) | 1110 |
| Tensile Modulus (psi) | 77,000 |

-continued

| | |
|---|---|
| Heat Deflection Temp. at 66 psi (°F.) | 190 |
| Notched Izod at 73° F. (in-lb/in) | 152 |

EXAMPLE III

| | |
|---|---|
| Exxon E 117 polypropylene | 353 g |
| Vistalon MD-714 elastomer | 151 g |
| Hi-Pflex 100 calcium carbonate | 496 g |

The ingredients were compounded as described in Procedure B and Example I, the temperature settings being the same. Physical data of the composition:

| | |
|---|---|
| Tensile Strength (psi) | 1490 |
| Tensile Modulus (psi) | 250,000 |
| Heat Deflection Temp. at 66 psi (°F.) | 240 |
| Notched Izod at 73° F. (in-lb/in) | 90 |

EXAMPLE IV

| | |
|---|---|
| Pro-Fax 6231 polypropylene | 594 g |
| Vistalon MD-714 elastomer | 149 g |
| Hi-Pflex 100 calcium carbonate | 257 g |

The three ingredients were compounded as described in Procedure B and Example I, the temperature settings being the same. Physical data of the composition:

| | |
|---|---|
| Tensile Strength (psi) | 2410 |
| Tensile Modulus (psi) | 224,000 |
| Heat Deflection Temp. at 66 psi (°F.) | 201 |
| Notched Izod at 73° F. (in-lb/in) | 28 |

Example IV demonstrates the relatively low impact resistance of compositions containing less than about 25 weight percent elastomer in the resin portion.

EXAMPLE V

| | |
|---|---|
| Pro-Fax 6523 polypropylene | 514 g |
| Vistalon MD-714 elastomer | 229 g |
| Hi-Pflex 100 calcium carbonate | 257 g |

The three materials were compounded according to Procedure B and Example I, the temperature settings being the same. Physical data of the composition:

| | |
|---|---|
| Tensile Strength (psi) | 1850 |
| Tensile Modulus (psi) | 157,000 |
| Heat Deflection Temp. at 66 psi (°F.) | 165 |
| Notched Izod at 73° F. (in-lb/in) | 139 |

EXAMPLE VI

| | |
|---|---|
| Exxon CD589 polypropylene | 395 g |
| Vistalon MD-714 elastomer | 169 g |
| Hi-Pflex 100 calcium carbonate | 436 g |

The materials were compounded as described in Procedure B and Example I, the temperature settings being the same. Physical data of the composition:

| | |
|---|---|
| Tensile Strength (psi) | 1600 |
| Tensile Modulus (psi) | 240,000 |
| Heat Deflection Temp. at 66 psi (°F.) | 212 |
| Notched Izod at 73° F. (in-lb/in) | 83 |

EXAMPLE VII

| | |
|---|---|
| Pro-Fax 6231 polypropylene | 1765 g |
| Epcar 847 G9 elastomer | 755 g |
| Hi-Pflex 100 calcium carbonate | 2480 g |

The ingredients were compounded according to Procedure A with total milling time being about 20 minutes. Physical data of the composition:

| | |
|---|---|
| Tensile Strength (psi) | 1630 |
| Tensile Modulus (psi) | 307,000 |
| Heat Deflection Temp. at 66 psi (°F.) | 216 |
| Notched Izod at 73° F. (in-lb/in) | 88 |

EXAMPLE VIII

| | |
|---|---|
| Pro-Fax 6231 polypropylene | 390 g |
| Solprene 414P elastomer | 210 g |
| Talcron CP-10-40 talc | 400 [G] g |

The three materials were [compounned] *compounded* as described in Procedure B and Example I, the temperature settings being the same. Physical data of the composition:

| | |
|---|---|
| Tensile Strength (psi) | 2000 |
| Tensile Modulus (psi) | 133,000 |
| Heat Deflection Temp. at 66 psi (°F.) | 179 |
| Notched Izod at 73° F. (in-lb/in) | 49 |

EXAMPLE IX

| | |
|---|---|
| Pro-Fax 6231 polypropylene | 31.2 g |
| Vistalon MD-714 elastomer | 13.4 g |
| Gama-Sperse 80 calcium carbonate | 15.4 g |

A bowl type 60 cc mixing chamber utilizing a pair of counter-rotating blades was heated to 380° F. The blades were rotated at 50 rpm. The polypropylene and elastomer were added with agitation until partially melted. After the gradual addition of calcium carbonate, the combination was mixed for an additional 8 minutes. The chamber was partially cooled and the product was stripped from the blades and the walls of the chamber. Multiple runs were needed to provide sufficient material for testing. Physical data of the composition:

| | |
|---|---|
| Tensile Strength (psi) | 1820 |
| Tensile Modulus (psi) | 178,000 |
| Heat Deflection Temp. at 66 psi (°F.) | 183 |
| Notched Izod at 73° F. (in-lb/in) | 126 |

EXAMPLE X

| | |
|---|---|
| Pro-Fax 6231 polypropylene | 520 g |
| Vistalon MD-714 elastomer | 223 g |
| Dix-Fil 10 calcium carbonate | 257 g |

The materials were compounded as described in Procedure B and Example I, the temperature settings being the same. Physical data of the composition:

| | |
|---|---|
| Tensile strength (psi) | 1900 |
| Tensile Modulus (psi) | 171,000 |
| Heat Deflection Temp. at 66 psi (°F.) | 175 |
| Notched Izod at 73° F. (in-lb/in) | 51 |

EXAMPLE XI

| | |
|---|---|
| Pro-Fax 6231 polypropylene | 449 g |
| Vistalon MD-714 elastomer | 193 g |
| Talcron CP-38-33 talc | 358 g |

The materials were compounded as described in Procedure B and Example I, the temperature settings being the same. Physical data of the composition:

| | |
|---|---|
| Tensile Strength (psi) | 2200 |
| Tensile Modulus (psi) | 272,000 |
| Heat Deflection Temp. at 66 psi (°F.) | 224 |
| Notched Izod at 73° F. (in-lb/in) | 41 |

EXAMPLE XII

| | |
|---|---|
| Pro-Fax 6523 polypropylene | 602 g |
| Vistalon 702 elastomer | 258 g |
| Kaopaque 30 clay | 140 g |

The ingredients were compounded as described in Procedure B and Example I, the temperature settings being the same. Physical data of the composition:

| | |
|---|---|
| Tensile Strength (psi) | 2100 |
| Tensile Modulus (psi) | 185,000 |
| Heat Deflection Temp. at 66 psi (°F.) | 176 |
| Notched Izod at 73° F. (in-lb/in) | 53 |

EXAMPLE XIII

| | |
|---|---|
| Pro-Fax 6231 polypropylene | 35.7 lb |
| Epcar 847 G9 elastomer | 15.3 lb |
| Hi-Pflex 100 calcium carbonate | 49.0 lb |

The materials were compounded in a commercial twin screw extruder at a melt temperature of 329° F. with no precompounding of the filler with polyolefin. Physical data of the composition:

| | |
|---|---|
| Tensile Strength (psi) | 1530 |
| Tensile Modulus (psi) | 306,000 |
| Heat Deflection Temp. at 66 psi (°F.) | 208 |
| Notched Izod at 73° F. (in-lb/in) | 70 |

EXAMPLE XIV

| | |
|---|---|
| Pro-Fax 6231 polypropylene | 372 g |
| Alathon 7040 high density polyethylene | 186 g |
| Vistalon MD-714 elastomer | 186 g |
| Hi-Pflex 100 calcium carbonate | 256 g |

The materials were compounded as described in Procedure B and Example I, the temperature settings being the same. Physical data of the composition:

| | |
|---|---|
| Tensile Strength (psi) | 1590 |
| Tensile Modulus (psi) | 132,000 |
| Notched Izod at 73° F. (in-lb/in) | 152 |

EXAMPLE XV

| | |
|---|---|
| Pro-Fax 6231 polypropylene | 553 g |
| Vistalon MD-714 elastomer | 297 g |
| Talcron CP-10-40 talc | 150 g |

The ingredients were compounded as described in Procedure B and Example I, the temperature settings being the same. Physical data of the composition:

| | |
|---|---|
| Tensile Strength (psi) | 2000 |
| Tensile Modulus (psi) | 124,000 |
| Heat Deflection Temp. at 66 psi (°F.) | 193 |
| Notched Izod at 73° F. (in-lb/in) | 118 |
| Flow Resistance Rating | 6.0 |

EXAMPLE XVI

| | |
|---|---|
| Alathon 7040 high density polyethylene | 385 g |
| Vistalon MD-719 elastomer | 165 g |
| Hi-Pflex calcium carbonate | 450 g |

The materials were compounded as described in Procedure B and Example I with the temperature settings being 376° F. for Zone 1, 384° F. for Zone 2 and 392° F. for the die. Physical data of the composition:

| | |
|---|---|
| Tensile Strength (psi) | 2100 |
| Tensile Modulus (psi) | 113,000 |
| Heat Deflection Temp. at 66 psi (°F.) | 139 |
| Notched Izod at 73° F. (in-lb/in) | 152 |
| Flow Resistance Rating | 8.5 |

EXAMPLE XVII

| | |
|---|---|
| Alathon 7040 high density polyethylene | 330 g |
| Vistalon MD-719 elastomer | 220 g |
| Hi-Pflex 100 calcium carbonate | 450 g |

The materials were compounded as described in Procedure B and Example XVI. Physical data of the composition:

| | |
|---|---|
| Tensile Strength (psi) | 1800 |
| Tensile Modulus (psi) | 82,000 |
| Heat Deflection Temp. at 66 psi (°F.) | 128 |
| Notched Izod at 73° F. (in-lb/in) | 175 |
| Flow Resistance Rating | 9.0 |

EXAMPLE XVIII

| | |
|---|---|
| Pro-Fax 7523 polypropylene copolymer | 385 g |
| Epcar 847 G9 elastomer | 165 g |
| Hi-Pflex 100 calcium carbonate | 450 g |

The ingredients were compounded as described in Procedure B and Example I with the temperature settings being 312° F. for Zone 1, 294° F. for Zone 2 and 312° F. for the die. Physical data of the composition:

| | |
|---|---|
| Tensile Strength (psi) | 1900 |
| Tensile Modulus (psi) | 165,000 |
| Heat Deflection Temp. at 66 psi (°F.) | 177 |
| Notched Izod at 73° F. (in-lb/in) | 168 |
| Flow Resistance Rating | 9.5 |

EXAMPLE XIX

| | |
|---|---|
| Rexene 178 low density polyethylene | 385 g |
| Epcar 847 G9 elastomer | 165 g |
| Talcron CP-10-40 talc | 450 g |

The materials were compounded as described in Procedure B and Example I with the temperature settings being 266° F. for Zone 1, 256° F. for Zone 2 and 266° F. for the die. Physical data of the composition:

| | |
|---|---|
| Tensile Strength (psi) | 1500 |
| Tensile Modulus (psi) | 31,000 |
| Heat Deflection Temp. at 66 psi (°F.) | 117 |
| Notched Izod at 73° F. (in-lb/in) | 135 |
| Flow Resistance Rating | 8.0 |

The compositions of this invention can also contain various conventional additives depending upon the specific applications of the polyolefin compositions such as light, oxygen and heat stabilizers, flame retardants, plasticizers, coloring agents, reinforcing agents, antistatic agents and the like.

The polyolefin composition of this invention can be used to make molded articles having high impact resistance, plastic shutters that will not sag when exposed to the sun and plastic furniture having a more wood-like, dead sound than furniture made of polystyrene. The most attractive use of these novel compositions is the core material in metal plastic laminates when high impact strength, increased rigidity and good resistance flow at high temperatures are required properties. The metal skin of the laminate may be any metal or [allow] *alloy* typically used in such laminates, such as steel, aluminum, copper, brass, titanium, or magnesium.

The following is an example describing such a laminate and a method for making it. To one surface of each of two (8 in×8 in) sheets of cold-rolled steel (0.012 in thickness) a polypropylene base adhesive primer, manufactured by Morton Chemical Co. under the trademark Adcote 78LJ6, is applied with a paint brush. The adhesive coated steel sheets are placed in a circulating air oven at 400° F. for two minutes, the adhesive primer fusing to a continuous, colorless coating. After cooling, the sheets are placed on each side of an (8 in×8 in) plastic sheet (0.024 in thickness) with the adhesive primed surfaces against the plastic producing a steel-plastic-steel "sandwich". The plastic sheet can be any polyolefin composition within the scope of the invention, preferably the polypropylene composition of Example XIII, that has been converted to a uniform sheet by compression molding on a flat platen press at 380° F. for three minutes.

The "sandwich" is next placed between the platens of a flat laboratory press heated to 400° F. Forty mil shims are positioned on either side of the "sandwich" and the press is closed with a pressure of about 40 psi for four minutes. The hot laminate is cooled in a tray of tap water. Appropriate size test coupons can be cut from the laminate for various physical, impact and forming tests.

In general, the formability of a laminate containing the compositions of this invention as core material is slightly poorer than the formability of a single skin by itself. The stiffness is only slightly less than that of a sheet of cold-rolled steel of the same thickness. The tensile strength is about that of two pieces of steel skin alone. When placed in an oven at 400° F. for one hour in a vertical position, none of the plastic core flowed out from between the steel skins.

Steel sheets from 0.006 in to 0.018 in were used as the skins including cold-rolled steel, galvanized steel, and steel sheets sold by Bethlehem Steel Corporation under the trademarks Galvalume and Duraskin. As to the overall thickness of the laminates, any thickness is possible. Laminates of 0.035 in to 0.125 in thickness were actually prepared.

FOOTNOTES

A—Pro-Fax 6231 polypropylene, Hercules Inc.
B—Pro-Fax 6523 polypropylene, Hercules Inc.
C—Exxon E 117 polypropylene, Exxon Chemical Co.
D—Exxon CD589 polypropylene, Exxon Chemical Co.
E—Pro-Fax 7523 polypropylene copolymer, Hercules Inc.
F—Alathon 7040 high density polyethylene, E. I. du-Pont de Nemours & Co., Inc.
G—Rexene 178 low density polyethylene, Rexene Polymer Co.
H—Vistalon MD-714 ethylene-propylene rubber, Exxon Chemical Co.
I—Vistalon MD-719 ethylene-propylene rubber, Exxon Chemical Co.
J—Vistalon 702 ethylene-propylene rubber, Exxon Chemical Co.
K—Epcar 847 G9 ethylene-propylene-diene rubber, B. F. Goodrich Chemical Co.
L—Solprene 414P styrene-butadiene rubber, Phillips Petroleum Co.
M—Hi-Pflex 100 calcium carbonate, Pfizer Co.
N—Gama-Sperse 80 calcium carbonate, Georgia Marble Co.
P—Dix-Fil 10 calcium carbonate, Dixie Lime and Stone Co.
Q—Talcron CP-10-40 talc, Pfizer Co.
R—Talcron CP-38-33 talc, Pfizer Co.
S—Kaopaque 30 clay, Georgia Kaolin Co.

I claim:

[1. As a new composition of matter, a resin blend of polyolefin and an elastomer to which a filler is added characterized by having rigidity, a high level of impace resistance and high temperature flow resistance, consisting essentially of:

(a) about 30 to 90 weight percent of a resin containing
(i) greater than 50 to less than 75 weight percent of at least one polyolefin selected from the group consisting of isotactic crystalline polypropylene, high density crystalline polyethylene, low density polyethylene and propylene-ethylene copolymers in which propylene is present in 85–95% by weight and which has a tensile yield elongation no greater than 20%, and
(ii) greater than 25 to less than 50 weight percent of elastomer and
(b) about 10 to 70 weight percent of an inorganic filler selected from the group consisting of calcium carbonate, talc, clay, silica, quartz, mica, and barytes.]

[2. The composition of matter of claim 1 wherein the resin is about 35 to 75 weight percent and the filler is about 25 to 65 weight percent.]

[3. The composition of matter of claim 1 wherein the resin is about 40 to 60 weight percent and the filler is about 40 to 60 weight percent.]

[4. The composition of matter of claims 1, 2 or 3 in which the polyolefin is isotactic crystalline polypropylene.]

[5. The composition of matter of claims 1, 2 or 3 in which the polyolefin is crystalline high density polyethylene.]

[6. The composition of matter of claims 1, 2 or 3 in which the polyolefin is low density polyethylene.]

[7. The composition of matter of claims 1, 2 or 3 in which the polyolefin is propylene-ethylene copolymer in which propylene is present in 85–95% by weight and which has a tensile yield elongation no greter than 20%.]

[8. The composition of matter of claims 1, 2 or 3 wherein the resin contains about 55 to 70 weight percent of the polyolefin and about 30 to 45 weight percent of the elastomer.]

[9. The composition of matter of claim 8 in which the polyolefin is isotactic crystalline polypropylene.]

[10. The composition of matter of claim 8 in which the polyolefin is crystalline high density polyethylene.]

[11. The composition of matter of claim 8 in which the polyolefin is low density polyethylene.]

[12. The composition of matter of claim 8 in which the polyolefin is propylene-ethylene copolymer in which propylene is present in 85–95% by weight and which has a tensile yield elongation no greater than 20%.]

[13. A method for making a metal-plastic laminate with a core material having a high level of impact resistance and high temperature flow resistance comprising sandwiching between two pieces of metal sheet a plastic sheet of the composition of matter of claim 1.]

14. A metal-plastic laminate containing a core material [of the composition of matter of claim 1] *sandwiched between two metal sheets, the core material being characterized by a high level of impact resistance and high temperature flow resistance and being a resin blend of a polyolefin and an elastomer to which a filler is added consisting essentially of:*

*(a) about 30 to 90 weight percent of a resin containing*
*(i) greater than 50 to less than 75 weight percent of at least one polyolefin selected from the group consisting of isotactic crystalline polypropylene, high density crystalline polyethylene, low density polyethylene and propylene-ethylene copolymer in which propylene is present in 85–95% by weight and which has a tensile yield elongation greater than 20%, and*
*(ii) greater than 25 to less than 50 weight percent of elastomer and*
*(b) about 10 to 70 weight percent of an inorganic filler.*

15. The [invention] *metal-plastic laminate* of claim [13 or] 14 in which the metal [is] *sheets are* steel.

16. The [invention] *metal-plastic laminate* of claim 15 [wherein] *in which* the polyolefin is isotactic crystalline polypropylene.

17. The [invention] *metal-plastic laminate* of claim 15 in which the polyolefin is crystalline high density polyethylene.

18. The [invention] *metal-plastic laminate* of claim 15 in which the polyolefin is low density polyethylene.

19. The [invention] *metal-plastic laminate* of claim 15 in which the polyolefin is propylene-ethylene copolymer in which the propylene is present in 85–95% by weight and has a tensile yield elongation no greater than 20%.

20. The [invention] *metal-plastic laminate* of claim 16 wherein the elastomer is a propylene-ethylene-diene terpolymer.

21. The [invention ] *metal-plastic laminate* of claim 20 wherein the resin portion comprises 70 percent by weight isotactic crystalline polypropylene and 30 percent by weight propylene-ethylene-diene terpolymer.

*22. The metal-plastic laminate of claim 14 wherein the resin is about 35 to 75 weight percent and the filler is about 25 to 65 weight percent.*

*23. The metal-plastic laminate of claim 14 wherein the resin is about 40 to 60 weight percent and the filler is about 40 to 60 weight percent.*

*24. The metal-plastic laminate of claims 14, 15 or 16 wherein the resin contains about 55 to 70 weight percent of the polyolefin and about 30 to 45 weight percent of the elastomer.*

*25. The metal-plastic laminate of claim 24 in which the polyolefin is crystalline high density polyethylene.*

*26. The metal-plastic laminate of claim 24 in which the polyolefin is low density polyethylene.*

*27. The metal-plastic laminate of claim 24 in which the polyolefin is propylene-ethylene copolymer in which propylene is present in 85–95% by weight and which has a tensile yield elongation no greater than 20%.*

* * * * *